United States Patent
Gordon

(10) Patent No.: US 10,596,445 B2
(45) Date of Patent: Mar. 24, 2020

(54) REFEREE SCOREKEEPING AND DATA DISSEMINATION SYSTEM

(71) Applicant: SHOOTER'S TOUCH, LLC, Southbury, CT (US)

(72) Inventor: Steven J. Gordon, Weston, MA (US)

(73) Assignee: SHOOTER'S TOUCH, LLC, Southbury, CT (US)

( * ) Notice: Subject to any disclaimer, the term of this patent is extended or adjusted under 35 U.S.C. 154(b) by 0 days.

(21) Appl. No.: 15/943,975

(22) Filed: Apr. 3, 2018

(65) Prior Publication Data

US 2018/0280783 A1 Oct. 4, 2018

Related U.S. Application Data

(60) Provisional application No. 62/481,181, filed on Apr. 4, 2017.

(51) Int. Cl.
| | | |
|---|---|---|
| A63B 71/06 | (2006.01) | |
| G06F 3/0488 | (2013.01) | |
| H04M 1/725 | (2006.01) | |

(52) U.S. Cl.
CPC ........ *A63B 71/0619* (2013.01); *G06F 3/0488* (2013.01); *G06F 3/04886* (2013.01); *H04M 1/72522* (2013.01); *A63B 2071/0663* (2013.01); *A63B 2225/50* (2013.01)

(58) Field of Classification Search
CPC ................................................. A63B 71/0669
See application file for complete search history.

(56) References Cited

U.S. PATENT DOCUMENTS

| | | | |
|---|---|---|---|
| 6,148,242 A | 11/2000 | Descalzi et al. | |
| 6,725,107 B2 | 4/2004 | MacPherson | |
| 6,984,176 B2 | 1/2006 | Bishop | |
| 8,731,458 B2 | 5/2014 | Sullivan | |
| 9,330,726 B1 | 5/2016 | Lawson et al. | |
| 9,393,485 B2 | 7/2016 | Sullivan | |
| 9,454,993 B1 | 9/2016 | Lawson et al. | |
| 2002/0049507 A1 | 4/2002 | Hameen-Anttila | |
| 2002/0091723 A1 | 7/2002 | Traner et al. | |
| 2007/0010335 A1* | 1/2007 | Al-Sabah | A63B 71/0605 463/47 |
| 2011/0032086 A1* | 2/2011 | Cabrera | A41D 20/00 340/323 R |
| 2012/0093481 A1* | 4/2012 | McDowell | G11B 27/105 386/241 |
| 2014/0344698 A1* | 11/2014 | Hohteri | G06F 3/0488 715/720 |
| 2016/0045810 A1* | 2/2016 | Minkovitch | A63B 71/0669 348/157 |

* cited by examiner

*Primary Examiner* — Reginald A Renwick
(74) *Attorney, Agent, or Firm* — Bachman & LaPointe, P.C.

(57) ABSTRACT

A sports game scorekeeping system, comprising electronic instrumentation allowing game officials to electronically input and record game statistics and wirelessly communicate them to both reconfigurable electronic scoreboards and remote computational systems. The instrumentation used by officials may be affixed to the official's arm or wrist and allow for touch or voice inputs so as to minimally distract the official from other game duties.

21 Claims, 3 Drawing Sheets

REFEREE SCOREKEEPING AND DATA DISSEMINATION SYSTEM

CROSS-REFERENCE TO RELATED APPLICATION

This application claims priority to U.S. Provisional Application No. 62/481,181 filed Apr. 4, 2017.

BACKGROUND

The present invention relates generally to systems and methods for inputting, recording, disseminating, displaying and documenting timing, scoring and statistical information related to a sports game in real time. More specifically, the present invention relates to systems and methods that allow a single referee to simultaneously officiate a game, communicate game information and document game statistics and results; whereas, these tasks are typically performed by a plurality of people.

The present invention relates to a sports game scorekeeping system that utilizes a wireless mobile computational system, a wireless scoreboard, at least one remote computational system and the internet to record, disseminate, store and display game information. In many sports games such as soccer/football, lacrosse, basketball, etc., a number of different officials are ideally required, such as a referee, several assistant referees, a timekeeper, a scorekeeper, a scoreboard operator, an announcer, etc. The present invention allows many of the activities performed by these officials to be completed in real time by a single referee while on the field of play. This is important since in many amateur, youth or club sport events, it may not be practical to hire a plurality of officials to perform the various tasks for all games. In this document, "field" is defined as any playing area for a sports game such as a basketball court, football gridiron, baseball diamond, corral, lacrosse field, race course, running track, cricket pitch, hockey rink, bicycle velodrome, swimming pool, etc.

Monitoring and accurately recording game data such as game timing, time outs, number of time outs, penalty times, penalty types, infringing players, scores, scoring players, stoppage times, overtime, ejections, scoreboard postings, field positions, social media postings, etc. (all or part of this list defined as a "plurality of game statistics" or "game data") is overwhelming for a single individual if he/she is using traditional disparate systems; thus, officiating any game is best performed by a plurality of officials. On the other hand, the referee on the field is typically aware of nearly all of the significant events that occur during a game. Thus, since most of these tasks fall within a finite set, if the referee is supplied with sufficiently easy-to-use tools, he/she should be able to communicate with the various devices and constituents through an appropriately integrated user interface system to perform many if not all of them. The aim of the current invention is to provide such a scorekeeping system and associated methods.

Previous systems have been reported to record data during games and make that data available to others after being stored in a database. For example, Sullivan, U.S. Pat. Nos. 8,731,458 and 9,393,485, describe data being recorded in a baseball game and displayed on remote devices for fans that are not present at the game. These data include graphical locations of plays on the field. Such a system would not be practical for use in a game with only a single official, given the complexity of data input. In addition, fans at the game would not be able to conveniently view game statistics unless the facility had an independent scoreboard operated by a dedicated official. Likewise, U.S. Pat. Nos. 9,454,993, 9,330,726, 6,148,242, 6,725,107, 6,984,176, 9,330,726, US 20020049507, US 20020091723, www.sportsengine.com, and www.siplay.com describe systems and methods for recording game statistics that require significant attention, not appropriate for a single, on-field official.

Wrist or arm-mounted wireless keypads have been used to directly control scoreboards from the field or sidelines (for example Funtronix Score N Time, Cave Creek, Ariz.). Although these systems are able to start and stop the game-clock, change game score and toggle other on/off indicators on a traditional scoreboard, they are unable to record more detailed game data, nor are they able to send a large plurality of game statistics to a scoreboard or any statistics to devices other than the scoreboard.

The present invention overcomes the limitations of previous systems and allows a single game official or referee to perform nearly all of the functions required to properly officiate, communicate and document the important statistics in a game. Such communication may include sharing game information with fans who are present at the event through scoreboards or similar displays and sharing game information with fans who are not present at the event, but who are monitoring through remote computational systems. By remote computational systems we mean any computer, laptop, tablet, smartphone or other device that can receive data through the internet. Such remote computational systems may be located at or near the field or any remote location.

SUMMARY

In accordance with the present disclosure, there is provided a scorekeeping system comprising at least one wireless mobile computational system, wherein the mobile computational system is configured to communicate with and send data over the internet; at least one wireless scoreboard, wherein the at least one wireless scoreboard is configured to wirelessly communicate with at least one of the wireless mobile computational system; at least one remote computational system; and wherein the remote computational system is configured to communicate with the internet to receive the data from the wireless mobile computational system.

In another and alternative embodiment, the wireless mobile computational system is at least one of wrist-mounted and arm-mounted.

In another and alternative embodiment, the wireless scoreboard is battery operated and transportable.

In another and alternative embodiment, the at least one wireless scoreboard comprises displays that are capable of being electronically configured to display a first plurality of game statistics, then electronically reconfigured to display one or more other pluralities of game statistics.

In another and alternative embodiment, the scorekeeping system further comprises each of the at least one wireless scoreboard has both an internal clock and visible clock; at least one of the wireless mobile computational systems has both an internal clock and visible clock; a difference in time between the internal clocks may be determined, the difference in time is subsequently used to assure synchronization between the visible clock.

In another and alternative embodiment, the wireless mobile computational system has a graphical touch screen.

In another and alternative embodiment, the wireless mobile computational system has a microphone and can translate speech to text, wherein such text may be interpreted as instructions to execute an operation on the mobile computational system.

In another and alternative embodiment, the wireless mobile computational system is comprised of a smartphone.

In another and alternative embodiment, additional wireless mobile computational systems are comprised of smartphones.

In another and alternative embodiment, the internet communication is over a WIFI connection.

In another and alternative embodiment, the wireless communication between the wireless scoreboard and the wireless mobile computational system is using a Bluetooth system.

In another and alternative embodiment, the at least one wireless scoreboard is two or more wireless scoreboards.

In another and alternative embodiment, the wireless mobile computational system executes software that is able to keep time of user-identified events in a sports game.

In another and alternative embodiment, one or more videos capturing the sports game may be edited based on the timing of the user-identified events.

In another and alternative embodiment, the editing is automatic based on the timing of the user-identified events and the time stamps of the one or more videos.

In accordance with the present disclosure, there is provided a method for communicating sports game information in real time comprising utilizing a wireless mobile computational system to wirelessly send automatically generated and user-generated game data; wirelessly receiving game data by at least one wireless scoreboard from the wireless mobile computational system; optionally wirelessly receiving game data by at least one other wireless mobile computational system from the wireless mobile computational system; and receiving game data through the internet by at least one remote computational system from the wireless mobile computational system.

In another and alternative embodiment, utilizing the wireless mobile computational system is by a single on-field official who is refereeing the sports game.

In another and alternative embodiment, the game data comprises: timing information for an internal clock in the mobile computational system; timing information for a visible game clock in the mobile computational system; and wherein such timing information allows the at least one wireless scoreboard and the optional other mobile computational system to accurately display times on their respective visible game clocks in synchrony with the visible game clock on the wireless mobile computational system even in the presence of communication delays.

In another and alternative embodiment, the user-generated game data is input though touching a touch sensitive screen.

In another and alternative embodiment, the user-generated game data is generated through speaking into a microphone incorporated in the mobile computational system and a speech-to-text software system.

In another and alternative embodiment, the game data through the internet includes a game report.

In another and alternative embodiment, the game data received by the at least one wireless scoreboard includes a plurality of game statistics and wherein the at least one wireless scoreboard is capable of being electronically configured to display a first plurality of game statistics, then electronically reconfigured to display one or more other pluralities of game statistics.

The objective of the current invention is to allow a single game official or referee to perform nearly all of the functions required to properly officiate and document an amateur game, thereby eliminating the plurality of officials that is typically required. It accomplishes this by utilizing at least one wireless mobile computational system that is optionally wrist or arm-mounted, at least one wireless scoreboard, and at least one remote computational system.

Each wireless mobile computational system is carried, or if wrist or arm-mounted, worn by an official to input game information. For a game that is not fully staffed with a plurality of officials, this will typically be a referee on the field of play who is responsible for officiating the game. Although the impetus for the present invention is to allow a single official to input all game data, it is also possible for a plurality of game officials or others present at the game to use a plurality of wireless mobile computational systems to input or receive data. By wearing the wireless mobile computational system on his/her arm or having it handy in some other convenient location, an official is able to quickly and easily input game information while remaining on the field and continuing to pay attention to game play. Data entry may be accomplished through either a graphical user interface on the wireless mobile computational system that involves one or more screens displayed on a touch sensitive display or by voice input. By tapping various displayed features on the screen or through voice commands, the official is able to quickly enter game information without lengthy disruptions of his/her attention from the game. When the mobile computational system is fitted with a microphone, more detailed information may be entered by voice and either saved as an audio recording, translated to text by a speech-to-text system or interpreted as data or instructions by the wireless mobile computational system, so as to execute an operation. With the advent of artificial intelligence methods, a number of speech-to-text services are available to be integrated into the software of a wireless mobile computational system, such as Google Cloud Speech API and Microsoft Bing Speech API. The wireless mobile computational system may be any number of devices that are microprocessor based including smartphones, tablets, smart watches, iPods, etc. that they be small enough to be strapped to an arm, held in the hand or placed in a pocket, have a cellular and/or WIFI and/or an RF (radio frequency) communication system, and have a graphical touch screen and/or voice input. The wireless mobile computational system must be able to have a connection to the internet through either a cellular link or a WIFI network. It is also possible for the wireless mobile computational system to communicate with a second computational system that serves as the interface to the internet. In this document, WIFI refers to any wireless networking protocol (such as IEEE 802.11) allowing multiple devices with radio transponders to communicate with one another and optionally the internet.

Each wireless scoreboard is able to display a plurality of game data that is sent by the one or more wireless mobile computational systems. Game data preferably includes visible game time remaining, intermission time remaining, internal clock time from the microprocessor, scores, period number, penalty type, penalty time remaining, scoring or infringing player number, or other stats for the sport being played. It is not necessary that the wireless scoreboard display all of the above information, as it may also only display basic information such as score and time remaining. In one embodiment, the wireless scoreboard may use a Bluetooth connection to communicate with a mobile computational system. Throughout this document, we use the term "Bluetooth" to denote any number of wireless technologies such as Bluetooth Smart, WIFI, or any other RF, optical, acoustic or other methods that do not require a wire connection to the mobile computational system. Each wireless scoreboard may use any number of technologies to display information including LED, LCD, OLED, CRT, flat screen, etc. A plurality of wireless scoreboards may be simultaneously wirelessly connected to one or more mobile computational systems. This may be implemented using Bluetooth, ANT+, WIFI or any number of other protocols. For example, most Bluetooth-Smart-enabled smartphones can connect to a number of other Bluetooth devices at the same time.

Conventional scoreboards, which have fixed configurations and can only display a small set of statistics such as game time, score, number of time outs, etc., are incapable of displaying the majority of plurality of game statistics captured and transmitted by the mobile computational systems during a game. In order to display the full plurality of game statistics, an electronically reconfigurable scoreboard is required. In one embodiment of the current invention, one or more wireless scoreboards have displays that are capable of being electronically configured to display a first plurality of game statistics, then electronically reconfigured to display one or more other pluralities of game statistics.

For timed sports games, the wireless scoreboards preferably display game time to an accuracy of 100 milliseconds, especially during the last 60 seconds of play within a period. They may keep accurate game time by either being a slave to the one or more mobile computational systems, or they may have their own internal timing clocks and just be synchronized at some interval to the one or more mobile computational systems. Preferably one of the mobile computational systems is the master game clock, since it is under direct control of the official that is responsible for keeping game time. In addition, it may be desirable for each scoreboard to have its own internal timing clocks, so each can continue to display an accurate game time, even when there is a temporary communication disruption or delay to the mobile computational system with the master game clock. Messages to the one or more wireless scoreboards may contain synchronization information to assure that the various clocks display the same time. By having independent clocks on each scoreboard, the number of wireless messages between the mobile computational system and wireless scoreboards that relate to timing may be reduced to only starting and stopping messages that include clock synchronization information, rather than a constant stream of messages every say 100 milliseconds.

In addition to communicating and synchronizing with scoreboards near the playing field, the scoring system in the current invention also communicates game data to one or more remote computational systems. This allows game officials to report the updated status of games to a database as well as to fans who may or may not be present at the game. With the appropriate software to collect all the game information, it also gives officials a simple method to submit final game reports at the conclusion of the game without filling out extensive paperwork.

Other details of the referee scorekeeping and data dissemination system are set forth in the following detailed description and the accompanying drawings wherein like reference numerals depict like elements.

DETAILED DESCRIPTION

Figure 1:
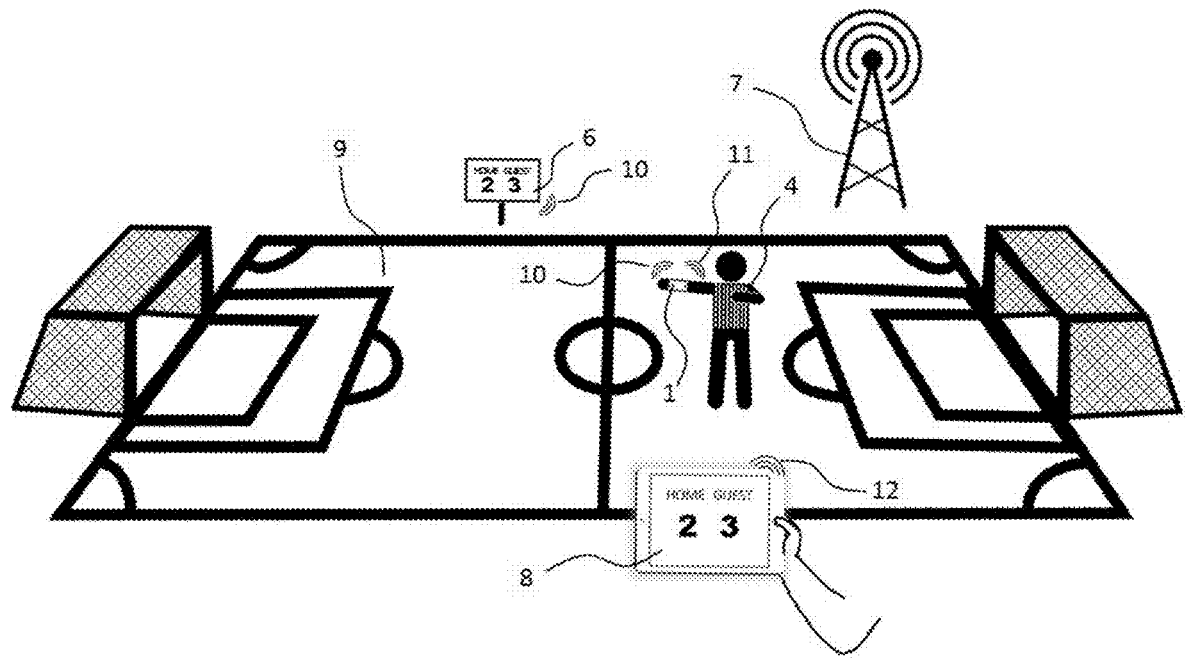
FIG. 1 shows an embodiment of the scorekeeping system with some of its components on a playing field. A cellular network and a remote computational system are shown at remote locations from the playing field.
Figure 2:
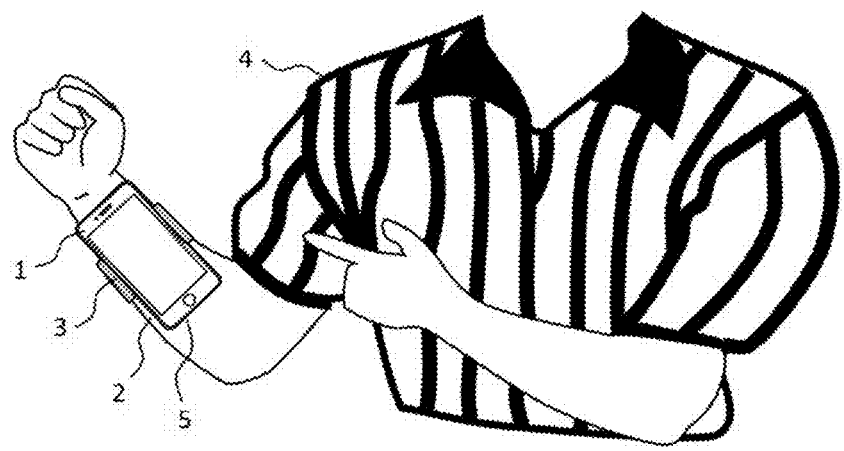
FIG. 2 shows an embodiment of a mobile computational system, a component of one embodiment of the scoring system.

The current invention involves a scorekeeping system that may be used by a game official 4 or other person on or near a field of play 9, comprised of at least one wireless mobile computational system 1 communicating with both 1) at least one wireless scoreboard 6 and 2) at least one remote computational system 8. In order to communicate with a remote computational system 8, the mobile computational system 1 is able to communicate with and send data over the internet using either a cellular connection 11 to a cellular network 7, or through a WIFI system that connects either directly or indirectly to the internet. Likewise, the remote computational system 8 may connect to the internet through either a cellular connection 12 or through a WIFI system. Each wireless scoreboard 6 can wirelessly communicate 10 with at least one wireless mobile computational system 1 through either a radio frequency connection such as Bluetooth, an ultrasonic connection, an electromagnetic radiation connection (such as infrared light) or some other wireless method.

One or more wireless mobile computational systems 1 may be optionally attached through a band 3 to the ear, wrist or arm 2 of an official 4. This mounting allows the official 4 to quickly access the mobile computational system 1, while he/she is running down the field 9 or otherwise occupied with his/her duties. A touch-sensitive screen on the mobile computational system 1, and/or a microphone input 5 allows the official 4 to quickly input game data to the device. Recently, a number of artificial-intelligence-based speech-to-text services have become available (for example, Google Cloud Speech API and Microsoft Bing Speech API). The accuracy of such algorithms have recently significantly improved and are sufficiently reliable to be used as a method for officials 4 to input data into a mobile computational system 1, especially if a set of predefined typical keywords are supplied to the algorithms. Such keywords might include team names, team colors, numbers, penalty names, etc. When these speech-to-text systems are integrated into the software of a wireless mobile computational system 1, the obligations of a single or small number of officials 4 are significantly simplified. For example, instead of being distracted while scrolling through a number of screens to input information about a penalty in a conventional user interface (including infraction severity, infraction name, infringing player, penalty time assessed, expulsion, etc.), the official 4 can simply say "Yellow card given to blue-team player 25 for tripping—Two minute penalty" while he is running down the field. Optionally, more detailed information may also be entered by voice and either saved as an audio recording, translated to text by a speech-to-text system or interpreted as data or instructions by the wireless mobile computational system 1. Officials 4 may also record and document verbal interactions with players or fans that result in penalties, expulsions, warnings or other disciplinary actions.

Figure 3:
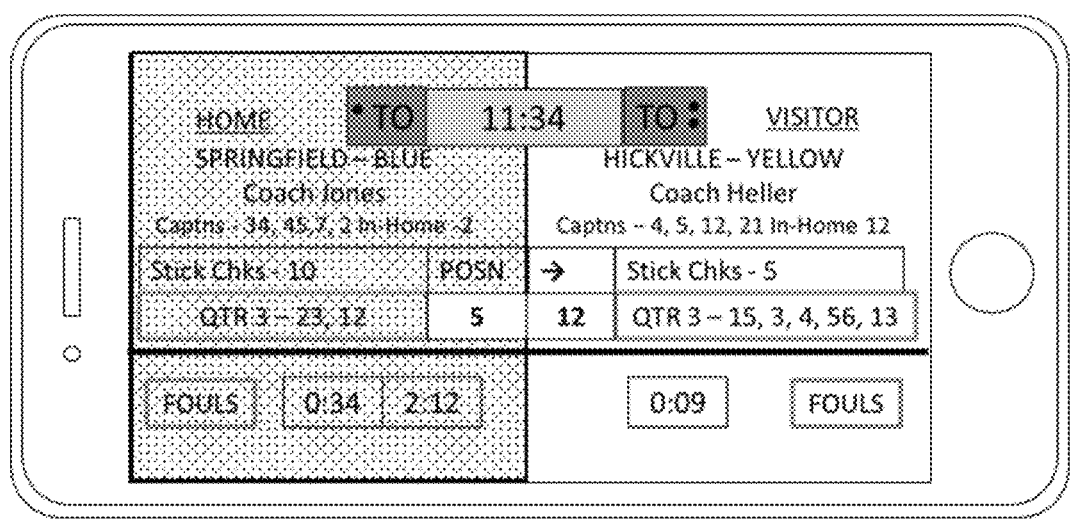
FIG. 3 shows an embodiment of a screen of a mobile computational system, a component of one embodiment of the scoring system.
Figure 4:
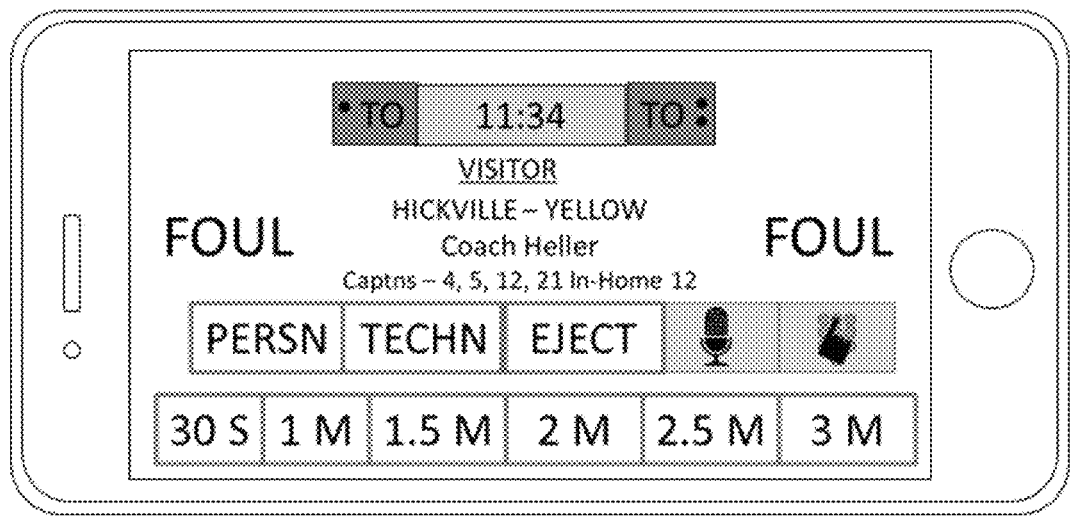
FIG. 4 shows another embodiment of a screen of a mobile computational system, a component of one embodiment of the scoring system.
Figure 5:
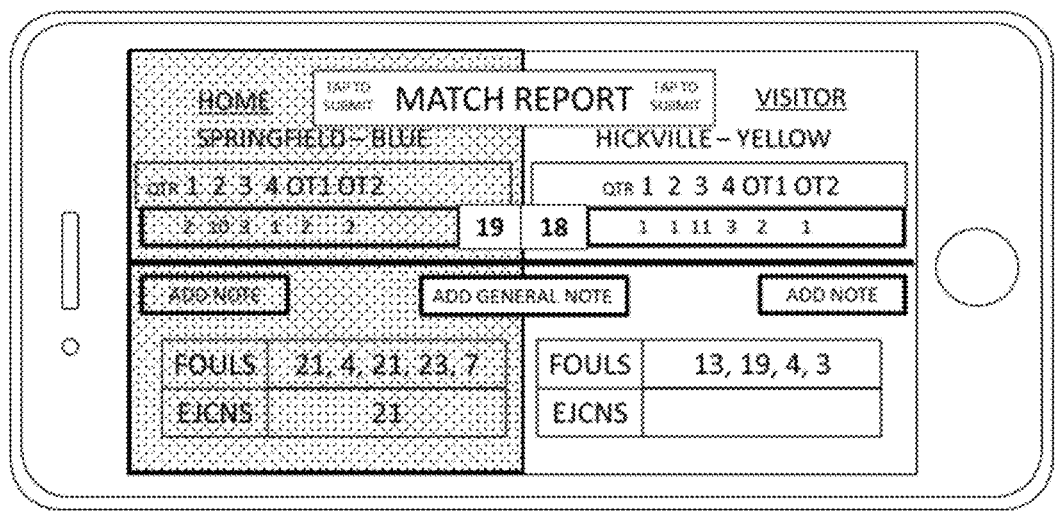
FIG. 5 shows another embodiment of a screen of a mobile computational system, a component of one embodiment of the scoring system.
Figure 6:
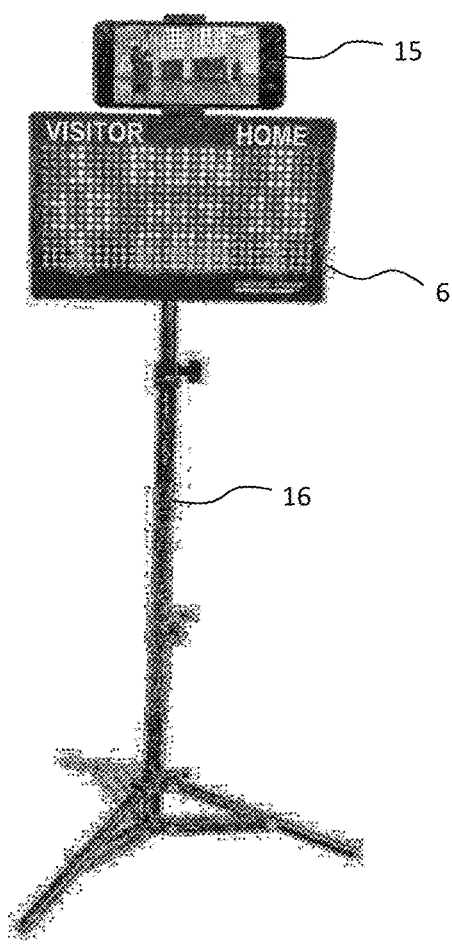
FIG. 6 shows an embodiment of a wireless scoreboard, a component of one embodiment of the scoring system.

In one embodiment, the wireless mobile computational system 1 has a graphical touch screen and is worn by a referee 4 on his/her arm 2. A number of difference screens may be displayed to present information about the game or to aid the referee in documenting events in the game. For example, FIG. 3 shows one embodiment of a home screen for men's American lacrosse. At a glance, the referee can see the team name, team color, coach name, team captain names, game time, number of time outs, current quarter, current score, current fouls, time remaining for fouls, etc. By tapping a portion of the screen, or by speaking into the device, the official 4 may move to a different screen, for example, the Fouls screen for the Yellow team in FIG. 4. In this screen he/she can easily select the type of foul, the penalty time that the player needs to be out of the game and the identity of the player. These may either be spoken into the microphone 5 or input through tapping on the screen or bringing up a keypad for manual entry. Likewise, any other number of screens to aid in the entry of detailed game information may be selected either through tapping on the home or other screens or by speaking into the microphone 5. Once the game is completed, the mobile computational system 1 automatically generates a final match report (or game report) and displays this on the screen, FIG. 5. The official 4 may edit the information, add a note or accept the report for submission. Such game report may include game score, overtime information, penalty information, expulsions, scoring player identities, times at which game events occurred, safety checks, etc.

In this document, we define an internal clock as a timekeeping circuit that is continuously running within a microprocessor and is typically not visible to users. We also define a separate visible game clock that reflects either the time remaining in or he time from the start of a game. Ideally, all of the visible game clocks are synchronized to one another to avoid any discrepancies. During most sporting games, a particular visible game clock is started and stopped by an official 4 as a function of game play, injuries, penalties, etc. This we define as the master visible game clock with its associated master internal clock, both of which are preferably on a master mobile computational system 1. All other visible game clocks need to reflect the same time as the master visible game clock in order to avoid discrepancies. The following method allows wireless scoreboards 6 and wireless mobile computational systems 1 to accurately display times in synchrony with one another in the presence of communication delays by transmitting timing information that includes both internal clock time and visible game-clock time. There are three types of timing messages that are passed from the master mobile computational system 1 to the other systems: SYNC_CLOCK, START_CLOCK and STOP_CLOCK. These three labels are used for ease of reference herein, but any number of other names or labels may be used. In the SYNC_CLOCK message, one of any number of synchronization protocols (such as described in the MCAP Bluetooth specification—https://www.bluetooth.com/specifications/adopted-specifications) is used to assure that the difference in the master internal-clock time and internal clock for any other connected device is known, thereby allowing any master visible game-clock time communicated to the other clocks to be accurately synchronized with the other visible game-clock times. Here we call such difference in internal-clock time as DELTA_i for devices i=1 through N; thus, once known (say DELTA_1=550 milliseconds), the internal-clock time for device 1 can be converted to master internal-clock time by subtracting 550 milliseconds from the device-1-internal-clock time. The START_CLOCK message contains three elements: the master internal-clock-time reading when the master visible game clock is started or restarted, the master visible game-clock reading that should be displayed at that time and either UP or DOWN to tell the remote clock which way to count. For example, if the START_CLOCK message is [951120; 5:20; DOWN] (where the first number is in milliseconds and the second number is in minutes:seconds), then device 1 should start its visible game clock at 5:20 when its internal clock is at 951,670 (assuming DELTA_1=550 milliseconds). If the START_CLOCK message is received after that time (which will nearly always be the case due to transmission and other delays), then the time difference should be subtracted from the visible game clock (assuming all visible game clocks are counting down). In this example, if remote device 1 receives the START_CLOCK message one second later at say 952,670 (its internal-clock reading), then it should start the visible game clock at 5:19 at that time rather than 5:20. The STOP_CLOCK message contains only the visible game-clock reading that should be displayed at that time the master game clock stopped. For example, if remote device 1 receives the STOP_CLOCK message of [6:35], then no matter what time is on its internal clock, it should display the time statically as 6:35 on its visible game clock until such time that the clock is restarted. This allows all clocks to show the correct stopped time. This scheme of starting and stopping clocks with additional information that allows them to synchronize, will especially be important if communications are infrequent (such as in certain Bluetooth protocols) or if the official 4 with the master mobile computational system 1 is running up and down a large field of play. In such a situation, it may be possible for the wireless communication between the master mobile computational system 1 and the one or more scoreboards 6 to be out of range or obscured from one another. In these situations, a game-time stoppage (STOP_CLOCK message) may not be received by the scoreboard 6 until communication is re-established. When it is re-established, the same STOP_CLOCK or START_CLOCK messages may be sent (without alteration) and all clocks will once again show the correct game time, as synchronization using the above method does not rely on the time the messages are sent. Game-related times beyond game time, such as penalty times, stoppage times, etc. may also be communicated between devices in a manner similar to the method above in order to assure synchronization.

In one embodiment of the wireless scoreboard 6, a stand 16 is utilized to elevate it so it is more visible from either the field or the stands. In another embodiment, a scoreboard 6 is hung or otherwise attached to a railing or other structure in from of the bleachers to allow fans to view it.

In another embodiment, the wireless scoreboard 6 has a feature that allows a camera or smartphone 15 fitted with a camera to be attached. This allows for the simultaneous viewing of the score by players and officials 4 on the field 9 and a recording of the action on the field 9. Alternatively, the scoreboard 6 may be facing the fans on the sideline and the camera or phone 15 may be affixed at say 180 degrees to record the field action. The camera attachment device may include a pan/tilt actuator to follow the action across a small portion of the field. For a pan/tilt system that is motorized and under joystick control, a spectator or official or automated system may point the camera to various parts of the field where important action is taking place. If the ball being used on the field is fitted with an electronic tracking system, such as the one Quuppa (Finland www.quuppa.com), then the pan/tilt-mounted camera may be programmed to automatically follow the portion of the field where the ball is located, thereby maximizing the chance of recording important action on the field.

By combining the game data generated by an official through inputs on a mobile computational system 1 with video or still-capture images by the camera or phone 15, a set of game highlights may be automatically recorded. For example, in a soccer game, a new goal recorded by the official 9 on his mobile computational system 1 may trigger the marking of a continuously running video recording by the camera or phone 15. In this case, a start time at say nine seconds before the indication by the official and an end time of say one second after the indication by the official may be defined, thereby defining a ten second highlight of the goal. These start and end times may be used to cull out a portion of the video by correlating them to the time stamps within the video recording. Penalties and other events recorded by officials may also be used to generate similar highlights.

There has been provided a referee scorekeeping and data dissemination system. While the referee scorekeeping and data dissemination system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A scorekeeping system comprising:
    at least one wireless mobile computational system, wherein said mobile computational system is configured to communicate with and send data over the internet;
    at least one wireless scoreboard, wherein said at least one wireless scoreboard is configured to wirelessly communicate with at least one of said wireless mobile computational system; each of said at least one wireless scoreboard has both an internal clock and visible clock, at least one of said wireless mobile computational systems has both an internal clock and visible clock; a difference in time between said internal clocks may be determined, said difference in time is subsequently used to assure synchronization between said visible clocks; and
    at least one remote computational system; and wherein said remote computational system is configured to communicate with the internet to receive said data from the wireless mobile computational system.

2. The scorekeeping system according to claim 1, wherein said wireless mobile computational system is at least one of ear-mounted, wrist-mounted and arm-mounted.

3. The scorekeeping system according to claim 1, wherein said wireless scoreboard is battery operated and transportable.

4. The scorekeeping system according to claim 1, wherein said at least one wireless scoreboard comprises at least one display that is capable of being electronically configured to display a first plurality of game statistics, then electronically reconfigured to display one or more other pluralities of game statistics.

5. The scorekeeping system according to claim 1, wherein said wireless mobile computational system has a graphical touch screen.

6. The scorekeeping system according to claim 5, wherein said wireless mobile computational system is comprised of a smartphone.

7. The scorekeeping system according to claim 1, wherein said wireless mobile computational system has a microphone and can translate speech to text, wherein such text may be interpreted as instructions to execute an operation on said mobile computational system.

8. The scorekeeping system according to claim 1, wherein said wireless mobile computational system comprises a smartphone.

9. The scorekeeping system according to claim 1, wherein said internet communication is over at least one of a WIFI connection and a cellular connection.

10. The scorekeeping system according to claim 1, wherein said wireless communication between said wireless scoreboard and said wireless mobile computational system is using a Bluetooth system.

11. The scorekeeping system according to claim 1, wherein said at least one wireless scoreboard is two or more wireless scoreboards.

12. The scorekeeping system according to claim 1, wherein at least one of said wireless mobile computational systems executes software that is able to keep time of user-identified events in a sports game.

13. The scorekeeping system according to claim 12, wherein one or more videos capturing said sports game may be edited based on said timing of said user-identified events.

14. The scorekeeping system according to claim 13, wherein said editing is automatic based on said timing of said user-identified events and the time stamps of said one or more videos.

15. A method for communicating sports game information in real time comprising:
    utilizing at least one wireless mobile computational system to wirelessly send automatically generated and/or user-generated game data;
    wirelessly receiving game data by at least one wireless scoreboard from at least one of said wireless mobile computational systems;
    optionally wirelessly receiving game data by at least one other wireless mobile computational system from said wireless mobile computational system;
    receiving game data through the internet by at least one remote computational system from said wireless mobile computational system; wherein said game data comprises:
    timing information for an internal clock in said mobile computational system; and
    timing information for a visible game clock in said mobile computational system; and wherein such timing information allows said at least one wireless scoreboard and said optional other mobile computational system to accurately display times on their respective visible game clocks in synchrony with said visible game clock on said wireless mobile computational system.

16. The method of claim 15, wherein said utilizing the wireless mobile computational system is by a single on-field official who is refereeing said sports game.

17. The method of claim 16, wherein said user-generated game data is generated through speaking into a microphone incorporated in said mobile computational system and a speech-to-text software system.

18. The method of claim 15, wherein said user-generated game data is input though touching a touch sensitive screen.

19. The method of claim 15, wherein said game data through the internet includes a game report.

20. The method of claim 15, wherein said game data received by said at least one wireless scoreboard includes a plurality of game statistics.

21. The method of claim 20, wherein said at least one wireless scoreboard is capable of being electronically configured to display a first plurality of game statistics, then electronically reconfigured to display one or more other pluralities of game statistics.

* * * * *